(12) United States Patent
Chen

(10) Patent No.: US 9,131,582 B2
(45) Date of Patent: *Sep. 8, 2015

(54) HIGH EFFICIENCY LED DRIVING CIRCUIT AND DRIVING METHOD

(71) Applicant: Silergy Semiconductor Technology (Hangzhou) LTD, Hangzhou, ZheJiang Province (CN)

(72) Inventor: Wei Chen, Saratoga, CA (US)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/537,714

(22) Filed: Nov. 10, 2014

(65) Prior Publication Data

US 2015/0061532 A1    Mar. 5, 2015

Related U.S. Application Data

(63) Continuation of application No. 14/161,991, filed on Jan. 23, 2014, now Pat. No. 9,024,542.

(30) Foreign Application Priority Data

Jan. 29, 2013   (CN) .......................... 2013 1 0036240

(51) Int. Cl.
*H05B 37/02*    (2006.01)
*H05B 33/08*    (2006.01)

(52) U.S. Cl.
CPC ........ *H05B 33/0887* (2013.01); *H05B 33/0815* (2013.01); *H05B 33/0893* (2013.01); *Y02B 20/341* (2013.01); *Y02B 20/346* (2013.01)

(58) Field of Classification Search
CPC ............... H05B 37/02; H05B 33/0815; H05B 33/0848; H05B 33/0851; H05B 33/0887; H05B 33/0893; Y02B 20/341; Y02B 20/346
USPC ................. 315/291, 294, 307, 224, 247, 308; 323/222, 207, 282, 271, 276, 290; 363/18–20, 21.12
See application file for complete search history.

(56) References Cited

U.S. PATENT DOCUMENTS

| 8,097,976 B2 | 1/2012 | Kitagawa et al. |
| 8,324,840 B2 | 12/2012 | Shteynberg et al. |
| 8,339,063 B2 * | 12/2012 | Yan et al. ....................... 315/291 |
| 8,421,424 B2 * | 4/2013 | Ishii .............................. 323/222 |
| 8,773,041 B2 | 7/2014 | Chen |

(Continued)

FOREIGN PATENT DOCUMENTS

CN        202261942 U       5/2012

*Primary Examiner* — Haissa Philogene
(74) *Attorney, Agent, or Firm* — Michael C. Stephens, Jr.

(57) ABSTRACT

In one embodiment, an LED driving circuit can include: (i) a sense circuit configured to sense an inductor voltage, and to generate a sense voltage signal; (ii) a protection control circuit configured to activate a first protection control signal in response to a comparison of the sense voltage signal against a first reference voltage to indicate an LED device is in a first load state; (iii) the protection control circuit being configured to activate a second protection control signal in response to a comparison of the sense voltage signal against a second reference voltage to indicate the LED device is in a second load state; and (iv) a PWM control circuit configured to control a power switch according to the first protection control signal or the second protection control signal, based on the load state of the LED device.

20 Claims, 5 Drawing Sheets

(56) References Cited

U.S. PATENT DOCUMENTS

| | | |
|---|---|---|
| 2013/0002159 A1 | 1/2013 | Chen et al. |
| 2013/0175936 A1 | 7/2013 | Chen |
| 2013/0181626 A1 | 7/2013 | Chen |
| 2014/0197739 A1 | 7/2014 | Lu |
| 2014/0210353 A1* | 7/2014 | Chen .......................... 315/127 |

* cited by examiner

HIGH EFFICIENCY LED DRIVING CIRCUIT AND DRIVING METHOD

RELATED APPLICATIONS

This application is a continuation of the following application, U.S. patent application Ser. No. 14/161,991, filed on Jan. 23, 2014, now issued as U.S. Pat. No. 9,024,542, and which is hereby incorporated by reference as if it is set forth in full in this specification, and which also claims the benefit of Chinese Patent Application No. 201310036240.2, filed on Jan. 29, 2013, which is incorporated herein by reference in its entirety.

FIELD OF THE INVENTION

The present invention relates to the field of power electronics, and more particularly to a high efficiency light-emitting diode (LED) driving circuit and driving method.

BACKGROUND

Along with increasing usage of light-emitting diode (LED)-based lights, LED drivers are becoming more important. In addition, the matching between LED drivers and associated LED light loads may directly affect the stability and safety of the LED loads. However, it is difficult to design an LED driver with good stability and high efficiency, and that can be matched with different control structures.

SUMMARY

In one embodiment, a light-emitting diode (LED) driving circuit can include: (i) a sense circuit configured to sense a voltage of an inductor, and to generate a sense voltage signal therefrom; (ii) a protection control circuit configured to activate a first protection control signal in response to a comparison of the sense voltage signal against a first reference voltage to indicate an LED device is in a first load state; (iii) the protection control circuit being configured to activate a second protection control signal in response to a comparison of the sense voltage signal against a second reference voltage to indicate the LED device is in a second load state; and (iv) a pulse-width modulation (PWM) control circuit configured to control a power switch according to the first protection control signal when the LED device is in the first load state, and to control the power switch according to the second protection control signal when the LED device is in the second load state.

In one embodiment, a method of driving an LED device can include: (i) sensing a voltage of an inductor to obtain a sense voltage signal; (ii) activating a first protection control signal in response to a comparison of the sense voltage signal against a first reference voltage to indicate the LED device is in a first load state; (iii) controlling, by a PWM control circuit, a power switch according to the first protection control signal when the LED device is in the first load state; (iv) activating a second protection control signal in response to a comparison of the sense voltage signal against a second reference voltage to indicate the LED device is in a second load state; and (v) controlling, by the PWM control circuit, the power switch according to the second protection control signal when the LED device is in the second load state.

Embodiments of the present invention can provide several advantages over conventional approaches, as may become readily apparent from the detailed description of preferred embodiments below.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Figure 1:
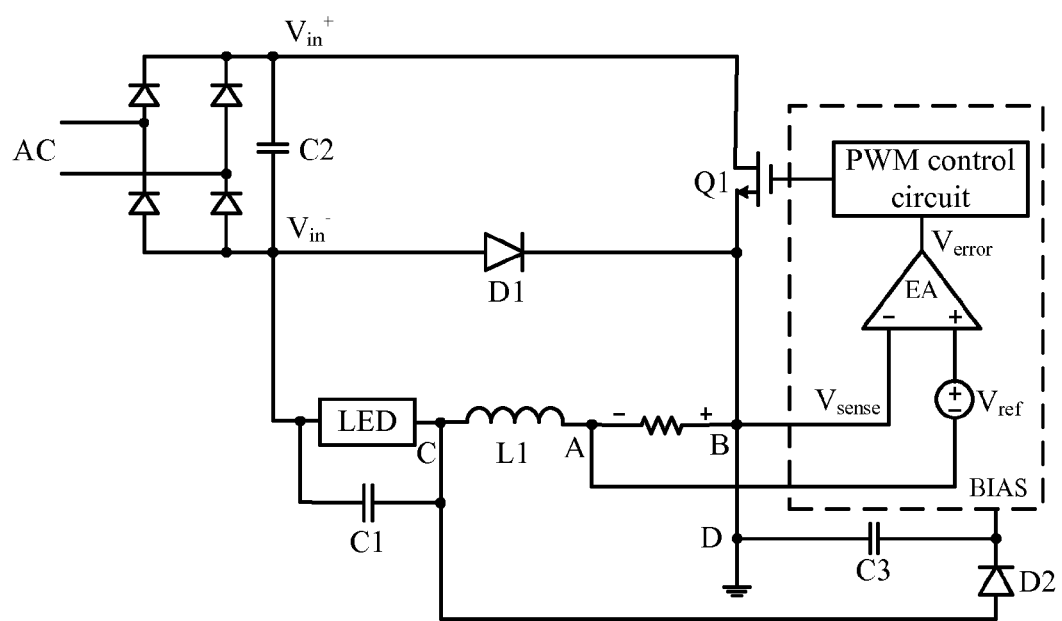
FIG. 1 is a schematic block diagram of a first example light-emitting diode (LED) driving circuit.

Referring now to FIG. 1, shown is a schematic block diagram of a first example light-emitting diode (LED) driving circuit. This particular example is a buck LED driver that includes a bias supply with diode D2 and capacitor C3. One terminal of diode D2 may be connected to common node C of LED apparatus and output inductor L1, while the other terminal of diode D2 may be connected to one terminal of capacitor C3. The other terminal of capacitor C3 can be connected to terminal D, as shown. A voltage of a common node of diode D2 and capacitor C3 may be transferred to the controller (e.g., including the pulse-width modulation [PWM] control circuit and the error amplifier) as the bias supply. Also, output capacitor C1 can also be omitted in some applications.

In this example, the supply of the controller may be provided by the bias supply generated from the LED output voltage, which can then be converted through the diode peak rectifier including diode D2 to further decrease power losses and cost. When the LED output voltage is relatively high, a buck regulator may be utilized for the controller. Also, when the LED output voltage is relatively low, a subsidiary winding may be added to output inductor L1 to generate the bias supply for the controller. Alternatively, a charge pump can be included to generate a higher voltage as the bias supply for the controller.

Figure 2:
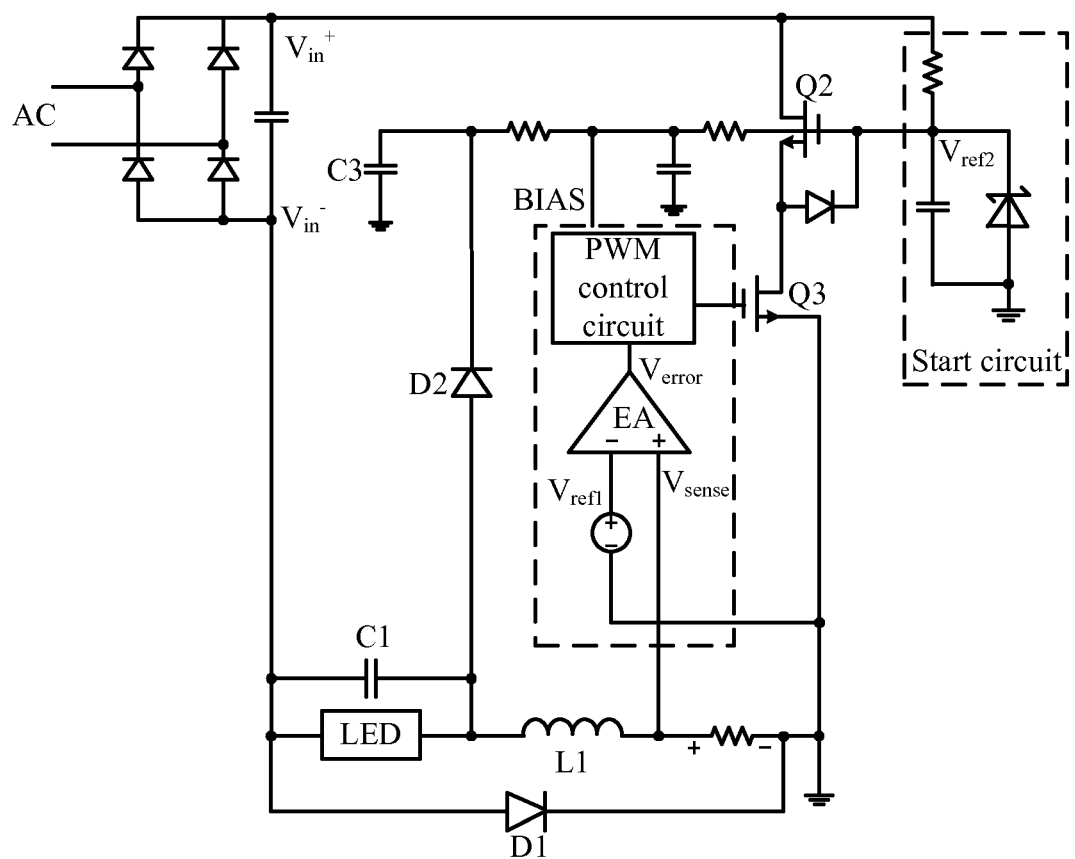
FIG. 2 is a schematic block diagram of a second example LED driving circuit.

Referring now to FIG. 2, shown is a schematic block diagram of a second example LED driving circuit. An AC input voltage supply may be converted to a DC voltage supply that includes first input voltage $V_{in}^+$ and second input voltage $V_{in}^-$ through the operation of a rectifier and filter capacitor. Power switches Q2 and Q3 can connect in series, and along with diode D1, capacitor C1, and inductor L1, may form a buck topology power stage. In this example, power switches Q2 and Q3 can be implemented as NMOS transistors, and a hybrid power switch is implemented by power switches Q2 and Q3 together with the start-up ("start") circuit. Here, a source of power switch Q2 can connect to a drain of power switch Q3, and a drain of power switch Q2 can connect to first input voltage $V_{in}^+$. Also, the source of power switch Q3 can connect to ground.

The start-up circuit can include a zener diode, a resistor, and a capacitor, as shown. A voltage of a common node between the resistor and zener diode may be voltage reference $V_{ref2}$. The capacitor can be connected in parallel with the zener diode in the start-up circuit, which may help to decrease the resistance of voltage reference $V_{ref2}$. The withstand or breakdown voltage of power switch Q3 may be no more than voltage reference $V_{ref2}$, and the withstand voltage of power switch Q2 can be a difference between a peak input voltage and voltage reference $V_{ref2}$.

Output diode D1 can connect between input voltage $V_{in}^-$ and the source of power switch Q3. Output inductor L1 and the LED device can be connected in series between input voltage $V_{in}^-$ and the source of power switch Q3 to reduce the AC current through the LED device. Also, output capacitor C1 can connect in parallel with the LED device to further reduce the AC current through the LED device. An LED current sensing circuit or resistor may be coupled in the output branch that includes output inductor L1 and the LED device. The LED current sensing circuit or resistor may be connected between output inductor L1 and the source of power switch Q3, and also connected to an input terminal of the controller in order to provide accurate LED current information, $V_{Sense}$.

The controller can include a PWM control circuit, an error amplifier (EA), and voltage reference $V_{ref1}$. In this example, one terminal of voltage reference $V_{ref1}$ may be connected to the source of power switch Q3, while the other terminal of voltage reference $V_{ref1}$ may be connected to an inverting input terminal of the error amplifier. The non-inverting input terminal of the error amplifier may receive LED current information $V_{Sense}$ that is sensed by the LED current sensing circuit, to generate error signal $V_{error}$ at the output terminal. A driving signal (e.g., to control power switch Q3) may also be generated by the PWM control circuit in accordance with the error signal $V_{error}$.

A diode can be connected to the drain of power switch Q3 to absorb and clamp peak leakage inductance. When powered on, the capacitor in the start-up circuit may be charged by the input voltage through the resistor until the voltage of the common node therein reaches the clamped voltage $V_{ref2}$ of the zener diode gradually, and the drain to source voltage of power switch Q3 may be clamped to a value of $V_{ref2}$. The starting current of the controller may be generated through voltage reference $V_{ref2}$ of by a resistor. When the voltage of a capacitor reaches a minimum starting voltage, the controller may come into operation to generate a driving signal to control power switch Q3 to periodically operate in an on and off condition. In this way, sufficient output current can be generated to drive the LED device.

For example, diode D2 and filter capacitor C3 may form a bias supply provider. One terminal of diode D2 can be connected to a common node of LED device and output inductor L1, while the other terminal of diode D2 maybe connected to one terminal of filter capacitor C3. The other terminal of filter capacitor C3 can connect to ground, as shown. A voltage may be filtered by a resistor and capacitor and transferred to the controller as the bias supply, BIAS. LED current may be accurately sensed by the LED current sensing circuit, and a feedback signal $V_{Sense}$ can be generated. The error amplifier can receive both feedback signal $V_{Sense}$ and voltage reference $V_{ref1}$ to generate an error signal $V_{error}$. A driving signal may be generated by the PWM control circuit in accordance with the error signal $V_{error}$ to control the on and off condition of power switch Q3.

When power switch Q3 is on, the source of power switch Q2 is effectively coupled to ground, the gate of power switch Q2 may receive voltage reference $V_{ref2}$, and then power switch Q2 can be turned on. When power switch Q3 is off, power switch Q2 may also correspondingly be off. The operation of both power switches Q2 and Q3 can be controlled by the driving signal generated by the PWM control circuit. An LED output voltage may be converted to the bias supply for the controller by a peak voltage rectifier including diode D2, which can decrease both power losses and cost. When the LED output voltage is relatively high, a buck may be used for the controller. When the LED output voltage is relatively low, a subsidiary or secondary winding may be used in addition to output inductor L1 to generate the bias supply for the controller.

One skilled in the art will recognize that power switches Q2 and Q3 can be any suitable type of transistor or transistors. In addition, the LED current sensing circuit can be implemented by a sensing resistor and/or other sensing element or elements. Further, the output capacitor may not be necessary, or can be connected to various suitable locations of the output branch. While one particular example of a buck LED driver employing a hybrid power switch has been described, one skilled in the art will recognize that other types of drivers, such as boost-buck and boost, can also be accommodated in particular embodiments.

In this way, different peripheral power stage circuits can be set to match with different control structures according to the relationships of the input power supplies and output voltages. Also, a PWM control circuit can receive LED current feedback, to improve the modulation accuracy of the LED current and achieve better stability. In addition, the PWM control circuit can drive a power switch directly with lower switch losses. Moreover, a complex magnetic component, such as a transformer or a multi-winding inductor, may not be necessary, thus possibly simplifying circuit design and lowering costs.

However, such example LED driving circuitry may not address various abnormal operating states (e.g., open circuit, short circuit, etc.) of the LED load. When the load is in an open circuit state, the output voltage can become instantly high (e.g., upon entering the open circuit state), and energy can be wasted and/or the circuit can be damaged due to such a high voltage without overvoltage protection. When the load is in a short circuit state, after the power switch is turned off, the input current can slowly fall, and then continually rise when the next switching period arrives without a short circuit protection circuit, possibly resulting in high input current and lower conversion efficiency. In particular embodiments, the load variation or state may be considered relative in control of a high efficiency LED driver, for load adapted LED driver operation.

In one embodiment, an LED driving circuit can include: (i) a sense circuit configured to sense a voltage of an inductor, and to generate a sense voltage signal therefrom; (ii) a protection control circuit configured to activate a first protection control signal in response to a comparison of the sense voltage signal against a first reference voltage to indicate an LED device is in a first load state; (iii) the protection control circuit being configured to activate a second protection control signal in response to a comparison of the sense voltage signal against a second reference voltage to indicate the LED device is in a second load state; and (iv) a PWM control circuit configured to control a power switch according to the first protection control signal when the LED device is in the first load state, and to control the power switch according to the second protection control signal when the LED device is in the second load state.

Figure 3:
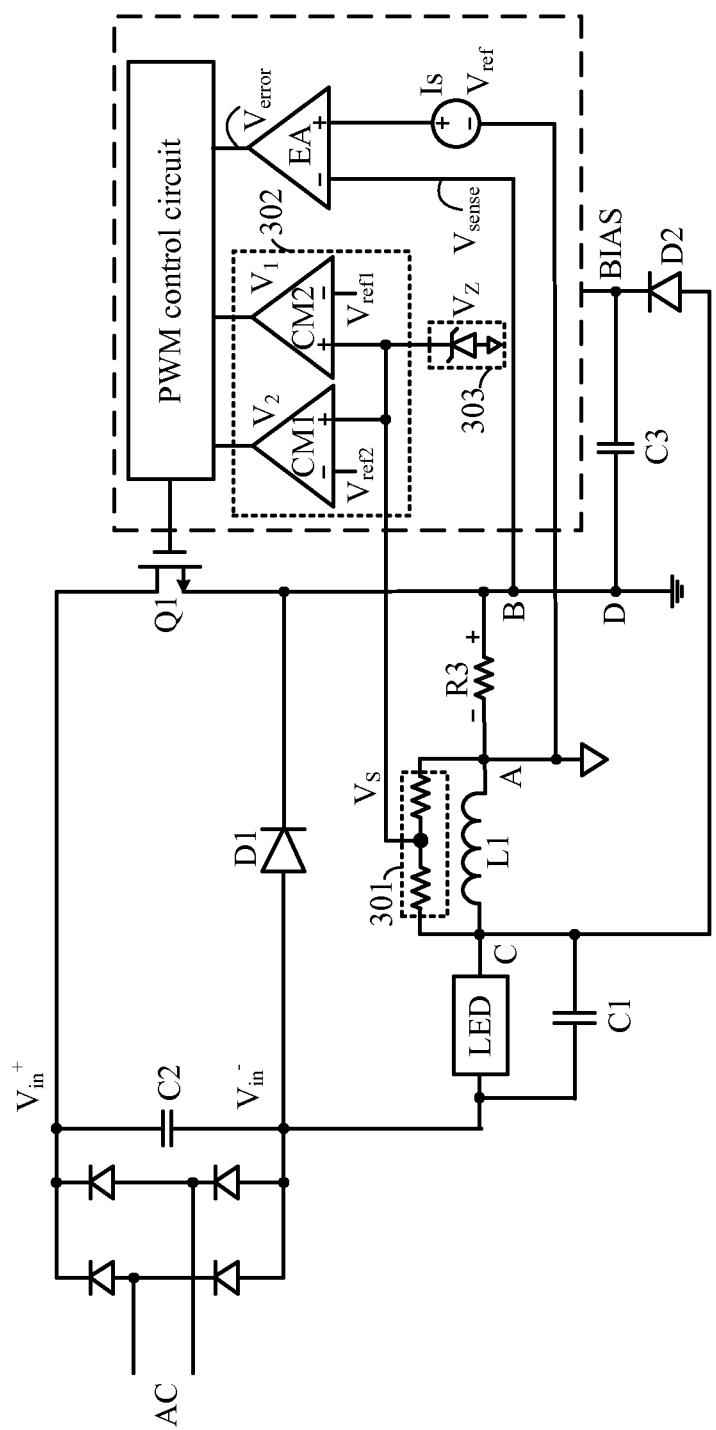
FIG. 3 is a schematic block diagram of a first example improved high efficiency LED driving circuit in accordance with embodiments of the present invention.

Referring now to FIG. 3, shown is a schematic block diagram of a first example improved high efficiency LED driving circuit in accordance with embodiments of the present invention. In this particular example, an AC input power supply can be converted to a DC power supply through a rectifier bridge and filter capacitor C2. Power switch Q1, diode D1, inductor L1, and capacitor C1 can form a power stage circuit having a buck topology. However, any other suitable converter topology (e.g., buck-boost, flyback, SEPIC, etc.) can be employed in particular embodiments. In this example, an LED current detect circuit can include resistor R3, a control circuit including a PWM control circuit and amplifier EA and first reference current source Is, and a bias power supply including diode D2 and capacitor C3.

This example LED driving circuit can also include sense circuit 301 and protection control circuit 302. Sense circuit 301 can be coupled to inductor L1 to sense the voltage of inductor L1, in order to obtain sense voltage signal $V_S$. Protection control circuit 302 can receive sense voltage signal $V_S$ for comparison against reference voltages $V_{ref1}$ and $V_{ref2}$. When the LED device is in a first load state (e.g., an open circuit state), protection control circuit 302 can activate or generate protection control signal $V_1$ based on a comparison of sense voltage signal $V_S$ against reference voltage $V_{ref1}$. The PWM control circuit can control power switch Q1 (e.g., to turn off) according to protection control signal $V_1$ (e.g., going high) when the LED device is detected as being in the first load state.

Protection control circuit 302 can also compare sense voltage signal $V_S$ against reference voltage $V_{ref2}$ via comparator CM2. When the LED device is in a second load state (e.g., a short circuit state), protection control signal $V_2$ can be activated or generated. The PWM control circuit can control power switch Q1 (e.g., to turn on) according to protection control signal $V_2$ (e.g., going high) when the LED device is detected as being in the second load state.

Thus, sense voltage signal $V_S$ can be compared against reference voltages $V_{ref1}$ (e.g., via comparator CM1) and $V_{ref2}$ (e.g., via comparator CM2), and a corresponding protection control signal (e.g., $V_1$ or $V_2$) may be activated. For example, the first load state (e.g., an open circuit state) can be detected when sense voltage signal $V_S$ reaches a level of reference voltage $V_{ref1}$, thus activating protection control signal $V_1$ and turning off power switch Q1 in response thereto. Similarly, the second load state (e.g., a short circuit state) can be detected when sense voltage signal $V_S$ reaches a level of reference voltage $V_{ref2}$, thus activating protection control signal $V_2$ and turning on power switch Q1 in response thereto. Of course, other combinations of signal activation (e.g., high or low), load state definitions, reference voltage settings, etc., can also be supported in particular embodiments.

Sense circuit 301 can include a voltage dividing resistor loop having one terminal coupled to a terminal of inductor L1, and the other terminal coupled to ground (e.g., the reference ground of the circuit control chip). Sense circuit 301 can include two resistors across the terminals of inductor L1, and a common node of the two resistors can be configured as sense voltage signal $V_S$. Of course, other types of sense circuitry (e.g., current and/or voltage sensing) can also be employed in particular embodiments. In addition, various ratios, resistance values, and/or numbers of resistors can be included in sense circuit 301.

Protection control circuit 302 can include comparators CM1 and CM2. In this example, the non-inverting terminal of comparator CM1 can receive sense voltage signal $V_S$, the inverting terminal can receive reference voltage $V_{ref1}$, and protection control signal $V_1$ can be generated based on a comparison of sense voltage signal $V_S$ against reference voltage $V_{ref1}$. For example, reference voltage $V_{ref1}$ can be an overvoltage protection voltage, which can be set according circuit protection needs, such as to a level above a normal operation range of sense voltage signal. The non-inverting terminal of comparator CM2 can receive sense voltage signal $V_S$, the inverting terminal can receive reference voltage $V_{ref2}$, and protection control signal $V_2$ can be generated in response to a comparison of sense voltage signal $V_S$ against reference voltage $V_{ref2}$. For example, reference voltage $V_{ref2}$ can be a zero reference voltage (e.g., set to zero), such as to provide a lower limit that may be outside of a normal operating range of sense voltage signal $V_S$.

When the LED device is in the first load state (e.g., an open circuit state), and power switch Q1 is off, the energy stored in inductor L1 can be transferred or circulated by capacitor C1 and diode D1. Also, sense voltage signal $V_S$ can effectively represent the output voltage, and the PWM control circuit can control power switch Q1. The output voltage may continually rise because no load device is connected with the output terminal to draw current therefrom. Comparator CM1 can compare sense voltage signal $V_S$ against reference voltage $V_{ref1}$, and when sense voltage signal $V_S$ rises to a level of reference voltage $V_{ref1}$, protection control signal $V_1$ can go high or be activated. The PWM control circuit can use protection control signal $V_1$ to turn off power switch Q1 for a certain (e.g., a predetermined) amount of time. This can reduce the input energy, and also the output voltage in order to achieve overvoltage protection.

When the LED device is in the second load state (e.g., a short circuit state), sense voltage signal $V_S$ can represent the inductor current, and the PWM control circuit can turn off power switch Q1. The inductor current may slowly fall because the load (e.g., the LED device) is in a short circuit state. Comparator CM2 can compare sense voltage signal $V_S$ against reference voltage $V_{ref2}$ (e.g., a zero reference voltage), and when sense voltage signal $V_S$ reaches the zero reference voltage, this may indicate that the inductor current has fallen to zero. Protection control signal $V_2$ may go high or be activated in response, and the PWM control circuit can use protection control signal $V_2$ to turn on power switch Q1. Because the inductor current may fall slowly, power switch Q1 can remain off until the inductor current reaches zero and power switch Q1 is turned on in response to protection control signal $V_2$ being activated. This can prolong the turn-off time of power switch Q1 in order to ensure that the inductor current does not rise too high in the next switching period, thus achieving overcurrent protection.

In some cases, the time for sense voltage signal $V_S$ to reach zero reference voltage $V_{ref2}$ may be relatively long. Thus, users can program or otherwise set a maximum turn-off time, and when the turn-off time of power switch Q1 reaches this maximum turn-off time, the PWM control circuit can turn on the power switch. This can ensure that the circuit recovers during normal operation relatively quickly once the short circuit state of the LED device is eliminated.

An LED driving circuit in particular embodiments can also include clamp circuit 303, which can be connected between sense circuit 301 and protection control circuit 302. Clamp circuit 303 can include clamp voltage $V_z$, and when sense voltage signal $V_S$ is less than clamp voltage $V_z$, clamp circuit 303 can clamp sense voltage signal $V_S$ to clamp voltage $V_z$. Clamp circuit 303 can ensure that sense voltage signal $V_S$ does not fall too low (e.g., less than zero), thus protecting the chip.

In this particular example, when the LED device is in the open circuit state, sense voltage signal $V_S$ can effectively represent the inductor current can equal the output voltage. Thus, the same sense circuit can be configured for both overvoltage and overcurrent protection. In addition, only one external pin may be needed to realize both overvoltage and overcurrent protection for the chip. The example of FIG. 3 shows one implementation of sense circuit 301 and protection control circuit 302; however, those skilled in the art will recognize that other suitable circuit structures, elements, and/or arrangements, can also be applied for sense and protection control circuitry in particular embodiments.

Figure 4:
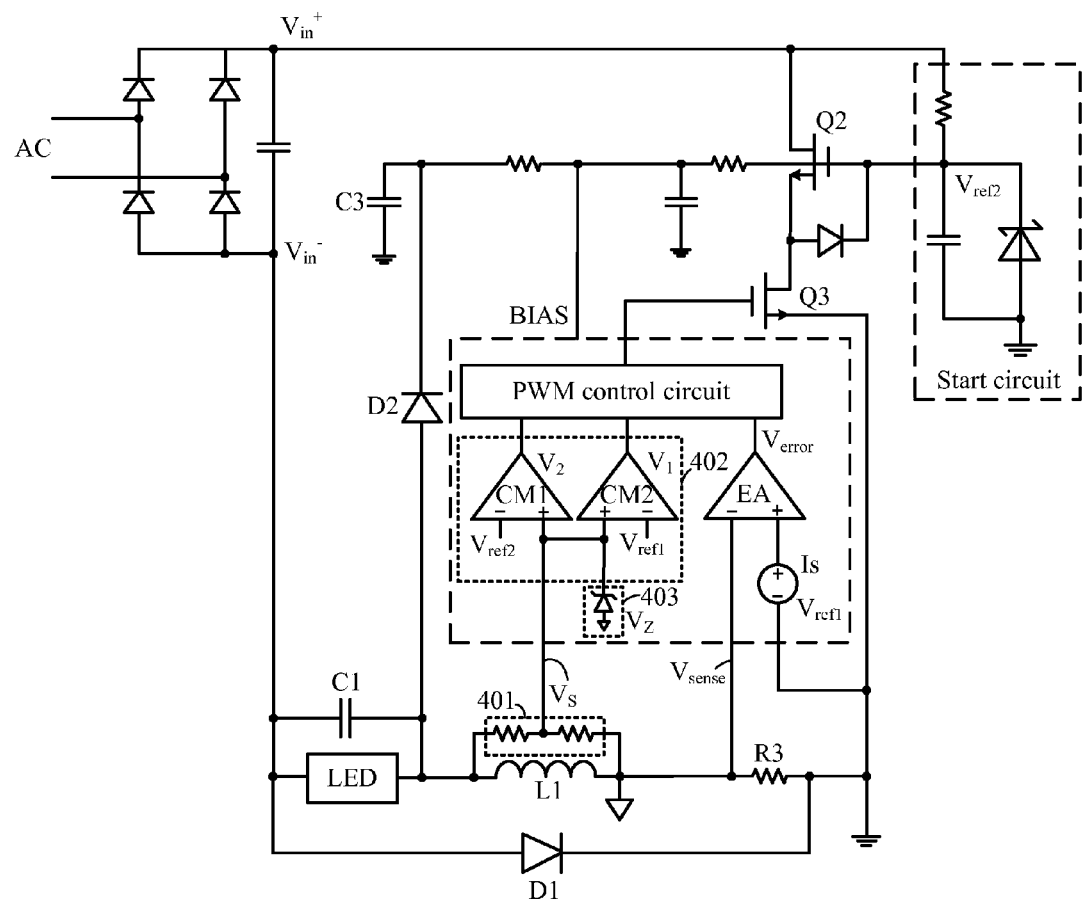
FIG. 4 is a schematic block diagram of a second example improved high efficiency LED driving circuit in accordance with embodiments of the present invention.

Referring now to FIG. 4, shown is a schematic block diagram of a second example improved high efficiency LED driving circuit, in accordance with embodiments of the present invention. In this particular example, a compound high voltage power switch is formed by series connected power switches Q2 and Q3 and the start or start-up circuit. This structure can form a buck converter topology together with diode D1, capacitor C1, and inductor L1. The compound high voltage power switch in this particular example can improve the circuit voltage withstand ability (e.g., increase its breakdown voltage).

In this example, the LED current detect circuit can include the PWM control circuit, the control circuit including amplifier EA and reference current source Is, and the bias power supply including diode D2 and capacitor C3. The LED driving circuit can include sense circuit 401 and protection control circuit 402, with the same or similar structures and functions as discussed above. In this way, overvoltage protection can be achieved when the LED device is in the open circuit state and overcurrent protection can be achieved when the LED device is in the short circuit state, thus improving the operating stability of the circuit. Those skilled in the art will recognize that other LED driving circuits and/or topologies (e.g., buck-boost, boost, etc.) can also be utilized in particular embodiments.

In one embodiment, a method of driving an LED device can include: (i) sensing a voltage of an inductor to obtain a sense voltage signal; (ii) activating a first protection control signal in response to a comparison of the sense voltage signal against a first reference voltage to indicate the LED device is in a first load state; (iii) controlling, by a PWM control circuit, a power switch according to the first protection control signal when the LED device is in the first load state; (iv) activating a second protection control signal in response to a comparison of the sense voltage signal against a second reference voltage to indicate the LED device is in a second load state; and (v) controlling, by the PWM control circuit, the power switch according to the second protection control signal when the LED device is in the second load state.

Figure 5:
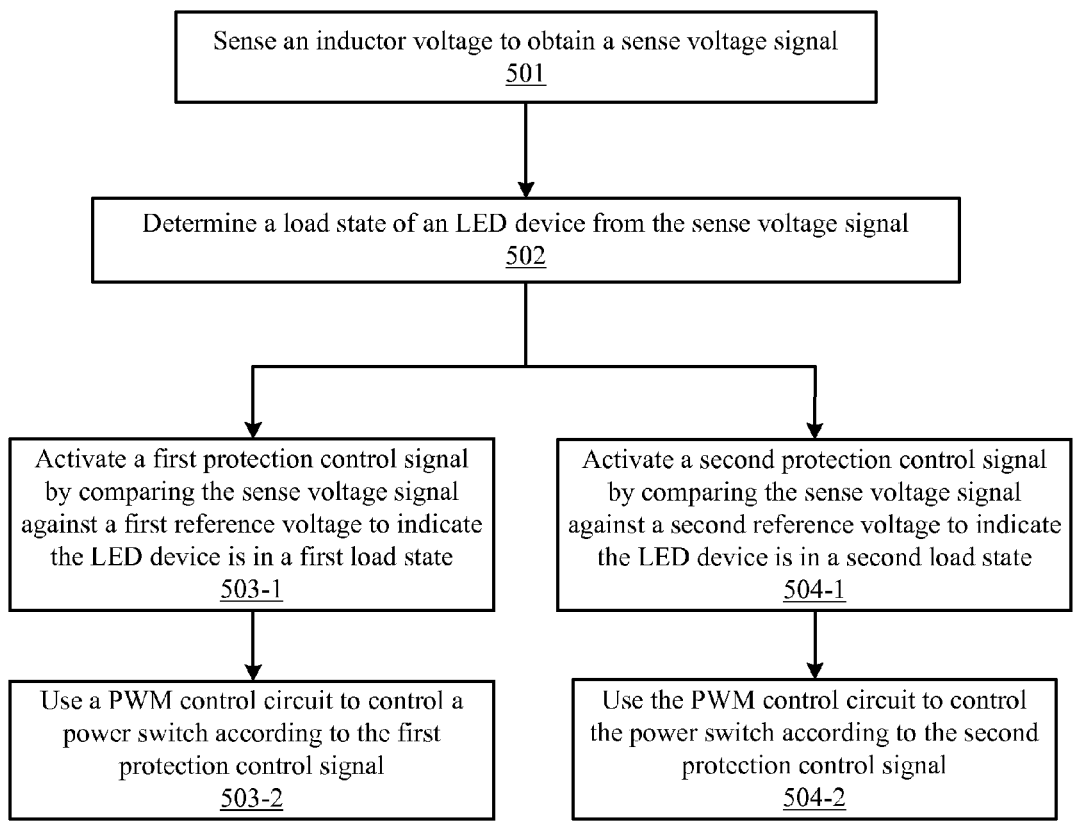
FIG. 5 is a flow diagram of an example method of driving an LED device in accordance with embodiments of the present invention.

Referring now to FIG. 5, shown is a flow diagram of an example method of driving an LED device in accordance with embodiments of the present invention. This LED driving method can be configured to drive an LED device with driving circuitry that includes an inductor, a power switch, and a PWM control circuit. At 501, the inductor voltage can be sensed (e.g., via sense circuits 301/401) to obtain a sense voltage signal (e.g., $V_S$). At 502, the load state (e.g., an open circuit state, a short circuit state, a normal state, etc.) of the LED device can be determined from the sense voltage signal.

At 503-1, a first protection control signal (e.g., $V_1$) can be activated in response to a comparison result of the sense voltage signal against a first reference voltage (e.g., $V_{ref1}$) to indicate that the LED device is in a first load state. At 503-2, a PWM control circuit can be used to control (e.g., to turn off) the power switch (e.g., Q1) according to the first protection control signal (e.g., $V_1$ being activated).

At 504-1, a second protection control signal (e.g., $V_2$) can be activated in response to a comparison of the sense voltage signal (e.g., $V_S$) against a second reference voltage (e.g., $V_{ref2}$) to indicate that the LED device is in a second load state (e.g., a short circuit state). At 504-2, the PWM control circuit can be used to control (e.g., to turn on) the power switch (e.g., Q1) according to the second protection control signal (e.g., $V_2$ being activated). Thus, protection control signal $V_1$ activated upon detection of an open circuit state of the load can be used turn off power switch Q1 to provide overvoltage protection. Also, protection control signal $V_2$ being activated upon detection of a short circuit state of the load can be used turn on power switch Q1 to provide overcurrent protection.

While open circuit and short circuit abnormal load conditions have been described herein, particular embodiments are also suitable to other load conditions. For example, any normal or abnormal load condition can be detected via sense circuitry, and control signals can be applied to override other control signals for the power switch. Thus, additional comparators and/or reference levels can be defined to correspond to predetermined abnormal operating or load conditions related to a sense voltage signal. Also, while reference voltages $V_{ref1}$ and $V_{ref2}$ have been described herein as being high and low boundary levels, respectively, of the sense voltage signal, other reference voltage level definitions (e.g., more than two reference levels, etc.) and the like, can also be supported in certain embodiments. Further, current reference levels can also be utilized alternatively or in addition to such voltage reference levels.

In particular embodiments, a high efficiency LED driving circuits and methods can employ protection control circuitry to realize an associated protection function when the load is abnormal (e.g., open circuit, short circuit, etc.). For example, such protection functions can be utilized in order to avoid overvoltage or overcurrent issues. An LED driving circuit of particular embodiments can improve circuit conversion accuracy by improving protection functionality, and also may simplify design of power switch driving circuitry. In this way, product costs and driving losses can be reduced, while also providing protection functions under such abnormal operating states.

The embodiments were chosen and described in order to best explain the principles of the invention and its practical applications, to thereby enable others skilled in the art to best utilize the invention and various embodiments with modifications as are suited to the particular use contemplated. It is intended that the scope of the invention be defined by the claims appended hereto and their equivalents.

What is claimed is:

1. A light-emitting diode (LED) driving circuit, comprising:
   a) a protection control circuit configured to activate a first protection control signal in response to a comparison of a sense voltage signal against a first reference voltage to indicate an LED device is in a first load state, wherein said sense voltage signal represents an output voltage of said LED driving circuit;
   b) said protection control circuit being configured to activate a second protection control signal in response to a comparison of said sense voltage signal against a second reference voltage to indicate said LED device is in a second load state;

c) a power stage circuit comprising an inductor coupled to a power switch through a resistor, wherein said sense voltage signal is determined by a voltage across said inductor; and d) a pulse-width modulation (PWM) control circuit configured to control said power switch according to said first and second protection control signals.

2. The LED driving circuit of claim 1, wherein said protection control circuit comprises:

a) a first comparator configured to receive said sense voltage signal and said first reference voltage, and to generate said first protection control signal, wherein said first reference voltage comprises an overvoltage protection voltage; and b) a second comparator configured to receive said sense voltage signal and said second reference voltage, and to generate said second protection control signal, wherein said second reference voltage comprises a zero reference voltage.

3. The LED driving circuit of claim 1, further comprising a sense circuit having a voltage dividing resistor loop coupled to said inductor and to ground.

4. The LED driving circuit of claim 3, further comprising:

a) a clamp circuit coupled between said sense circuit and said protection control circuit; and b) said clamp circuit being configured to clamp said sense voltage signal to a clamp voltage when said sense voltage signal is less than said clamp voltage.

5. A method of driving a light-emitting diode (LED) device, the method comprising:

a) sensing a voltage of an inductor in a power stage circuit to generate a sense voltage signal, wherein said power stage circuit comprises a power switch coupled to said inductor through a resistor;

b) activating a first protection control signal in response to a comparison of said sense voltage signal against a first reference voltage to indicate said LED device is in a first load state, wherein said sense voltage signal represents an output voltage of an LED driving circuit;

c) activating a second protection control signal in response to a comparison of said sense voltage signal against a second reference voltage to indicate said LED device is in a second load state; and d) controlling, by a pulse-width modulation (PWM) control circuit, said power switch according to said first and second protection control signals.

6. The method of claim 5, wherein said first reference voltage comprises an overvoltage protection voltage.

7. The method of claim 5, wherein said second reference voltage comprises a zero reference voltage.

8. The method of claim 5, wherein said sensing said inductor voltage comprises using a voltage dividing resistor loop.

9. The method of claim 5, further comprising clamping said sense voltage signal to a clamp voltage when said sense voltage signal is less than said clamp voltage.

10. The method of claim 5, wherein said controlling said power switch according to first and second protection control signals comprises:

a) turning off said power switch in response to said first protection control signal being activated; and b) turning on said power switch in response to said second protection control signal being activated.

11. The method of claim 10, wherein said turning off said power switch comprises keeping said power switch off for a predetermined time duration to provide overvoltage protection.

12. The method of claim 10, wherein said turning on said power switch comprises turning said power switch on after an inductor current reaches zero to provide overcurrent protection.

13. The LED driving circuit of claim 1, wherein said first load state comprises an open circuit state.

14. The LED driving circuit of claim 1, wherein said power switch is turned off in response to said first protection control signal being activated.

15. The LED driving circuit of claim 14, wherein said power switch remains off for a predetermined time duration to provide overvoltage protection.

16. The LED driving circuit of claim 1, wherein said second load state comprises a short circuit state.

17. The LED driving circuit of claim 1, wherein said power switch is turned on in response to said second protection control signal being activated.

18. The LED driving circuit of claim 17, wherein said power switch is turned on after an inductor current reaches zero to provide overcurrent protection.

19. The LED driving circuit of claim 17, wherein said power switch is turned on after a predetermined time duration to provide overcurrent protection.

20. The LED driving circuit of claim 1, wherein:

a) said first reference voltage comprises an overvoltage protection voltage; and b) said second reference voltage comprises a zero reference voltage.

* * * * *